INVENTORS
ROBERT K. ERF
EDWARD C. WINGFIELD
HERBERT G. AAS
BY Donald F. Bradley
ATTORNEY United States Patent Office  3,480,368
Patented Nov. 25, 1969

3,480,368
ANGLE SENSING SYSTEM USING A DIVERGING-CONVERGING SCAN
Robert K. Erf, Glastonbury, Edward C. Wingfield, Wethersfield, and Herbert G. Aas, East Hartford, Conn., assignors to United Aircraft Corporation, East Hartford, Conn., a corporation of Delaware
Filed Aug. 13, 1965, Ser. No. 486,584
Int. Cl. G01b *11/26;* G01c *3/08*
U.S. Cl. 356—172                                7 Claims

ABSTRACT OF THE DISCLOSURE

An angle sensing system in which a laser beam is rotated in a diverging-converging spiral scan by an ultrasonic cell to illuminate a target, and the time between receipt of the signals reflected from the target is measured to determine the position of the target within the field of view independent of target range.

---

This invention relates to an angle sensing system, and particularly to a system employing ultrasonic laser beam scanning for accurately determining the position of a target within a field of view of an optical system.

The system disclosed herein employs a pulsed or continuous wave laser beam rotated in a spiral scan by an ultrasonic beam deflection cell, the spiraling beam being transmitted through a telescope to illuminate a target within the field of view. A receiver having a photodetector senses the reflected signals from the target. By measuring the time between reflected signals, the angular position of the target relative to the axis of the telescope is uniquely determined. The system is independent of the range of the target, and is based solely on measurement of time. A range measurement capability may be added to the system by measuring the time between the initiation of the laser pulse and the reception of the reflected signals.

The angle sensing system described herein is specifically adapted for determining the position of objects such as satellites and space vehicles in conjunction with observation and tracking telescopes, and will be described as applied thereto, although it will be apparent that the system is not limited to such application but is useful for determining the position of any target.

In order to accurately track or communicate with a satellite or space vehicle, it is necessary to know the position of the satellite with a high degree of precision. The methods used previously have given rise to difficulties because of the uncertainties in their measurements. For example, microwave techniques involve problems in resolution, and the mass of large optical tracking telescopes makes it difficult for them to follow a fast moving object with the accuracy desired. With the system disclosed herein it is necessary to know the position of the satellite only to an accuracy which will place it within the field of view of the observation telescope, and to follow the satellite in its movement in space to keep the satellite within the field of view of the telescope; a precision well within the capability of existing tracking systems. As long as the satellite remains within the field of view of the tracking or observation telescope, its position relative to the axis of the telescope may be precisely determined.

By utilizing a nonmechanical ultrasonic light beam deflection system, the problems associated with prior art rotating wedge mechanical types of angle sensors have been eliminated. In addition, since the system disclosed herein requires only a measurement of time, a sophisticated optical receiver with its associated optical resolution problems and expense is avoided.

It is therefore an object of this invention to provide a range independent angle sensing system for determining target position.

Another object of this invention is an angle sensing system in which target position is determined by measurement of time.

A further object of this invention is a target position measurement system incorporating a range measuring capability.

Another object of this invention is an angle sensing system incorporating an ultrasonically deflected and scanned pulsed laser beam.

A further object of this invention is a novel beam scanning system utilizing an ultrasonically deflected laser beam pulsed in synchronism with the scanning system.

These and other objects of this invention may be more fully understood by referring to the following description and claims, read in conjunction with the accompanying drawings, in which:

Figure 1:
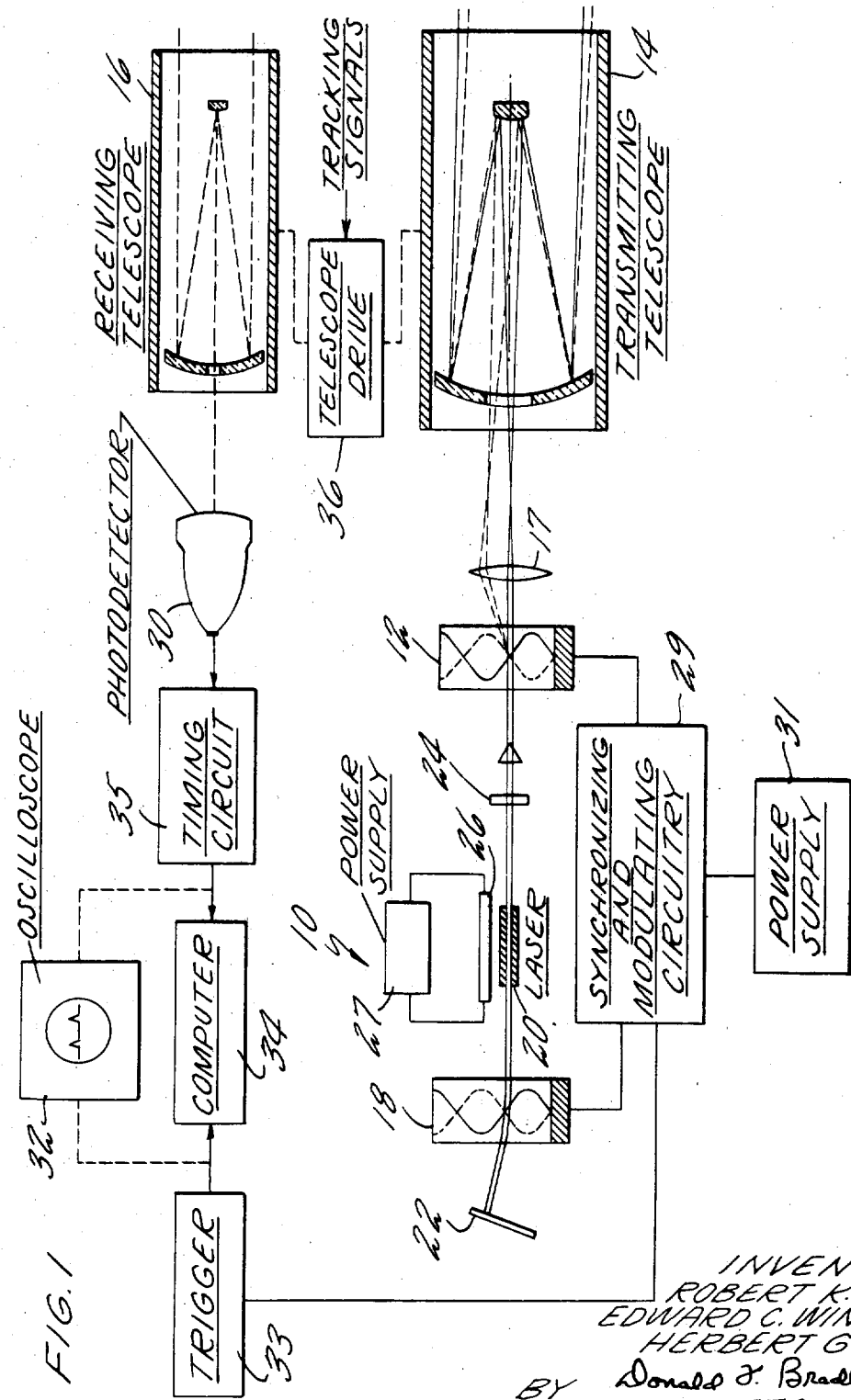
FIGURE 1 shows schematically the angle sensing system.

The schematic illustration of the range independent angle sensing system of FIGURE 1 shows that the major components are a laser 10, a two dimensional optical beam scanner 12, a laser gating component 18, a transmitting telescope 14, and a receiving telescope 16 with a photosensor 30. The system is based on the application of ultrasonic techniques to deflect and scan a laser beam relative to the axis of an optical transmitting telescope to thereby periodically illuminate a portion of the sky represented by the telescopic field of view.

The laser 10 is gated by a one-dimensional ultrasonic cell 18, the cell being driven by an acoustic wave of proper frequency generated by modulating circuitry 29, in order to produce the proper time sequence and duration of the pulse from the laser. The ultrasonic gating cell 18 is inserted in the laser feedback cavity between the laser rod 20, which, for example, may be a ruby laser, and totally reflecting end mirror 22. Although an ultrasonic cell is preferred, other devices such as a rotating mirror or a Kerr cell may be inserted in the laser feedback cavity to perform the gating or Q-switching. A partially reflecting cavity end mirror 24 completes the laser cavity. A pumping lamp 26 and associated power supply 27 are also required as is well known in the laser art.

Ultrasonic gating in the laser feedback cavity in order to produce pulses is well known in the art, and is described in detail in U.S. patent application Ser. No. 228,969, entitled "Ultrasonic Control of Lasers" filed Oct. 8, 1962, by Anthony J. DeMaria, now abandoned. Briefly, the pumping of the ruby laser rod 20 by pump 26 is initiated prior to the excitation of the ultrasonic cell 18 due to a variable delay (not shown). Mirror 22 is deviated from parallelism a sufficient amount so that for a given amount of pumping enough of the spontaneous fluorescence from rod 20 is deflected away from the rod rather than returned to it to prevent lasing. In essence, the optical feedback path of the ruby has been blocked. The delay is set to actuate cell 18 with a high voltage pulse to pass an ultrasonic wave through the medium within the cell at a time when the overpopulation of excited atoms within the laser rod is at a maximum. The spontaneous radiation from the laser rod 20 passing through cell 18 to mirror 22 interacts with the ultrasonic wave and is refracted. A condition occurs in which the laser radiation is directed perpendicular to mirror 22. At this time a high restoration of positive feedback to the ruby laser rod is initiated, and laser action will occur with a very large burst of radiation. A series of relatively large pulses may also be obtained by periodically exciting the ultrasonic cell 18 during normal lasing action.

The basic physical principle upon which the optical beam scanning cell operates is that a beam of light in passing through a density gradient normal to the direction of light propagation will be bent toward the region of higher density. Thus, by setting up an ultrasonic standing wave in a refractive medium, a time varying sinusoidal density gradient will be established which will alternately refract a light beam, passing through a pressure nodal plane, to either side. Ultrasonic scanning cells adapted to be used in the system disclosed are described in detail in U.S. patent application Ser. No. 407,082 now U.S. Patent 3,399,013, entitled "Ultrasonic Scanning Cell" filed Oct. 28, 1964, by Herbert G. Aas and Robert K. Erf and assigned to the same assignee.

Figure 2:
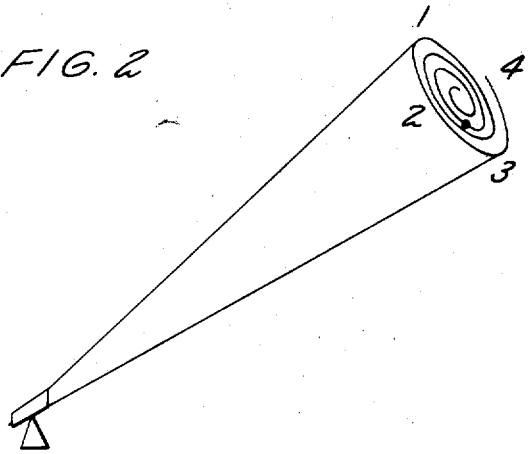
FIGURE 2 shows the laser scan pattern generated in space.

The pulsed laser beam is transmitted through ultrasonic beam scanning cell 12 where a two-dimensional spiral scan is produced as shown in FIGURE 2. Either two deflection cells, one for the horizontal and one for the vertical direction, or a single cell which provides a two-dimensional scan may be used. A two cell deflection system is disclosed in the above referred to U.S. patent application Ser. No. 407,082 now U.S. Patent 3,399,013. A single cell which produces a two-dimensional beam scan is disclosed in U.S. Patent 3,372,973.

If two ultrasonic cells are used for optical beam scanner 12, each cell will produce a spot of light which moves with simple harmonic motion. If both cells are driven at the same frequency but with a 90° phase shift between them, a circular scan will be generated. This scan can then be made to spiral by modulating the driving power, i.e., the amplitude of the sonic waves in the cells, which in turn modulates the radius of the scanning circle at a frequency lower than the ultrasonic frequency and thereby provides two-dimensional area coverage. Appropriate modulating circuitry is shown at block 29 and a power supply at 31.

The spiraling laser beam is transmitted through a relay optical system shown as lens 17 and then through transmitting telescope 14 where it illuminates a portion of the sky represented by the telescopic field of view. A target such as a satellite within the field of view will reflect a light signal which is detected by receiving telescope 16 and fed through the telescope 16 to a photo-detector 30. The output pulses from the detector may then be fed to a cathode ray oscilloscope 32 for visual display and also fed to electrical timing circuitry 35 and computer 34 where the time interval between pulses is measured and the angle of the target relative to the transmitting telescope axis is computed as will be described. Computer 34 receives a pulse from synchronizing circuit 29 when the laser is fired via trigger circuit 33 to thereby provide an indication of time zero and a reference for measuring the time of receipt of the pulses from the target.

The two-dimensional modulated ultrasonic optical beam scanner 12 must be driven with sufficient amplitude to provide the desired field coverage within the limitations of the telescopic field of view. The spiral scan is generated beginning at the center and progressing outward, then inward back to the center. The laser 10 is then pumped and gated to emit a single constant intensity pulse of a duration equal to or slightly greater than one cycle of the beam scanner modulating frequency. Synchronization of the pulse initiation with zero deflection position in the beam scanner modulation cycle by synchronization circuitry in block 29 causes the laser beam to spiral out and then in during its lasing period. If the target is within the field of view of the transmitting telescope, the outgoing laser radiation will impinge on the target twice, once while spiralling out and once while spiralling in. Detection of the two reflected signals and measurement of the time difference between them will uniquely determine the azimuthal and radial position of the target relative to the axis of the telescope regardless of the range. Measurement from time zero to the reception of the two pulses will produce a signal indicative of range.

The information may be updated as frequently as the laser can be pulsed, and the telescopic mechanical movement need only be sufficient to maintain the object within the field of view. Telescope drive mechanism illustrated at block 36 moves both telescopes in synchronism in response to tracking signals (not shown) to keep the telescopes trained on the target.

Figure 3:
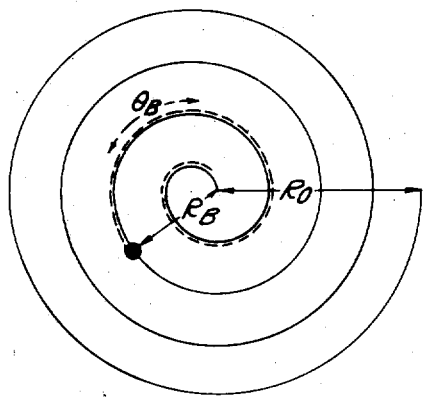
FIGURE 3 shows schematically the actual laser scan.

FIGURE 2 represents the laser scan pattern generated in space with the solid angle, defined by the points 1 through 4, being equal to the telescopic field of view. FIGURE 3 represents the scan where, to facilitate the drawing, the separation of the scanning lines is exaggerated and the laser beam is represented as a single line rather than having width as would be the case in an actual system, thereby providing complete field illumination over the period of one scan. Further, in FIGURE 3 the scan is only shown spiralling out, rather than out and in as would be the case in actual operation.

A circular scan is generated by sending the laser beam through the two-dimensional optical beam scanner 12 or the two one-dimensional ultrasonic beam scanners. In either case two ultrasonic standing waves are generated orthogonally to each other at the same frequency $f_s$ but 90° out of phase. As indicated previously this scan is subsequently made to spiral in and out by amplitude modulating the sonic pressure in both waves at a lower frequency, $f_m$. Consequently, each point on the spiral can be uniquely represented by expressing its position as a function of, first, the time from the zero amplitude position in the modulation cycle; second, the two frequencies, scanning and modulating; and third, the maximum deflection angle.

This is most conveniently done by describing each point on the outward spiral in terms of R (measure of the telescopic off-axis angle) and θ (measure of the azimuthal position) as indicated in FIGURE 3 and expressed mathematically as:

$$R = 2f_m t R_0$$

and $$\theta = 2\pi f_s t$$

where:

$R_0$ = radial angle corresponding to the maximum deflection angle
$f_m$ = modulating frequency (typical value 1000 c./s.)
$f_s$ = scanning frequency (typical value 100,000 c./s.)
$t$ = time from $R=0$ (zero amplitude position in the modulation cycle) to the radical position of the target.

Figure 4:
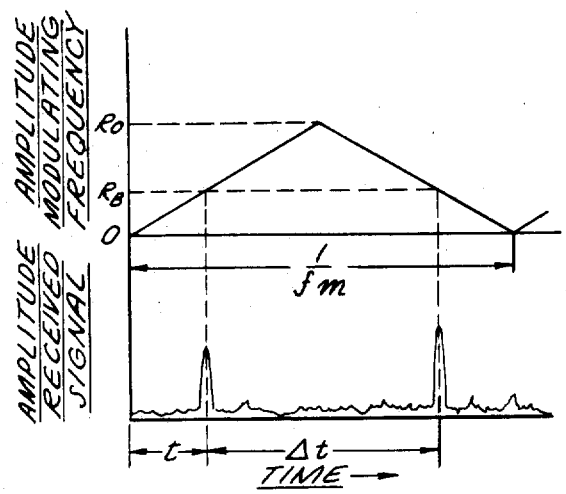
FIGURE 4 shows the modulation frequency and received target signal.

These relationships are illustrated in FIGURE 4 which is a representation of the modulation frequency and a typical received signal from a target at the position indicated in FIGURE 3. Considering the target position B, the outgoing laser radiation will strike the object twice as it spirals out and in providing a received signal trace as indicated in FIGURE 4. Knowing the modulation frequency, $f_m$, and measuring $\Delta t$ (time between received pulses) from the received signal; 5 may be calculated from the relationship:

$$t = \frac{1}{2}(1/f_m - \Delta t)$$

and, subsequently, R and θ may be evaluated from the above-stated expressions as:

$$R = R_0(1 - f_m \Delta t)$$

and $$\theta = \pi(f_s/f_m)(1 - f_m \Delta t)$$

Thus, to determine R and θ, it is only necessary to make the straight-forward measurement of Δt, which is independent of range. Further, since it is strictly a time differential measurement between two received pulses, high quality image forming optics are not required permitting the use of large aperture collection systems, thereby increasing detection probability and/or range capability. When in use the ultrasonic deflection system 12 can be continually operated, and the laser 10 pulsed, in synchronization with the zero amplitude point on the modulating envelope when an angular measurement is required.

As stated earlier, measurement of the time from pulsing the laser to the reception of the two pulses would add a range capability. In this mode, it is necessary to measure the total time from initiation of the laser pulse to the receipt of the first signal in the photodetector, and to subtract from this the time $t$ which is the time from the zero amplitude position of the spiral scan. The relationship may be written:

$$\text{Range} = \frac{\text{velocity of light}}{2} (\text{total time} - t)$$

In calculating the time, $t$, in the above mathematical expressions it has been assumed that the target is stationary. Object movement during the time interval between the outgoing and incoming spirals must be considered in order to evaluate the effects of such movmeent on the accuracy of the measurement. The variation in Δt which would be expected when observing a moving object as opposed to a stationary object is a function of the object's velocity and range and the system modulation frequency.

Since complete field illumination is required, the system modulation frequency is dependent upon the scanning frequency selected, laser beam spread and the number of resolvable elements desired across the field. For example, assuming a laser beam spread of 90 seconds; 5:1 relay reduction optics and a 30-minute telescopic field-of-view, complete illumination coverage could be provided with 50 circular scans (30 minutes/18 seconds=100 units=50 circles); thus the modulation frequency must be no greater than 1/100 the scanning frequency, if complete field illumination is to be provided with no overlap. That is, for a scanning frequency of 500,000 c.p.s., the modulation frequency should be 5000 c.p.s. or less.

It is possible to evaluate the effects on system accuracy of a moving target by assuming a velocity and range. For example, taking a target moving at 15,000 m.p.h. at a distance of 1500 kilometers it can be shown that each second of time corresponds to approximately .264 degree of circular arc. Thus, assuming the target to be on axis, which would cause the largest error in Δt based on a stationary target, for the outgoing pulse and a modulation frequency of 5000 cycles/second, the target would move approximately .2 second of arc before the modulated scan returned to the axial position. Therefore, the second received pulse would appear at an earlier time, on the order of 20 nanoseconds regardless of the direction of travel, than would be expected when assuming a stationary target. If, on the other hand, the target is off-axis, target movement between being illuminated by the outgoing and incoming spiral would be less than for the on-axis case, and thus the change in Δt from an assumed stationary object would be less; but, the second signal would occur at an earlier or later time dependent upon the direction of target movement. In either case the angular displacement of a moving object is less than the system resolution capability.

A continuous wave laser may be used rather than a pulsed laser, but in this case it is necessary to compensate for the ambiguity in the consecutively received pulses by additional circuitry to determine the received pulse sequence. For example, a reference marker may be generated at the beginning of each cycle of beam modulation, or the intervals between alternate pulses could be used to eliminate the ambiguity. Such techniques are known to those skilled in the art.

By choosing the power of the relay optical system 17 such that the telescopic angular field-of-view matches the sonic cell angular capability, absolute system resolution would increase in proportion to the obtainable deflection angle. For example, increasing the sonic cell deflection angle from 1° to 5° would decrease the least resolvable angle by a factor of 5. That is, with a 1 degree sonic cell and a 30-minute telescopic field-of-view, each minute of sonic cell angle corresponds to 30 seconds of the actual field whereas with a 5° sonic cell each minute corresponds to 6 seconds of the actual field. Therefore, if the sonic cell deflection angle is known to ½ minute the angular position of the outgoing beam is known to 3 seconds of arc.

Resolution capability is further enhanced by the fact that angular measurement is based on the measurement of time which is inherently one of the most accurate measurements available.

Another advantage of this system over prior art systems is the increased detection probability based on signal to noise considerations. If the laser pulse is spread, as opposed to concentrated and sequentially scanned, to cover the telescopic field-of-view, the received signal will be equal in duration to the outgoing pulse suggesting better detection probability employing integration techniques. However, the much shorter duration pulses, equal to the scan time across the target, received from the scanning system described herein will be of much greater amplitude by virtue of the higher energy density in the beam. Therefore, while both techniques are comparable for a noise-free system, if the background noise is of the same order of magnitude as the received signal from the unscanned, spread transmitted pulse, the chances of detection are much greater with a short duration high amplitude pulse. Consequently, while suffering little or no disadvantage in a noise-free or low-noise system, the scanning technique offers a distinct advantage in the presence of high background illumination.

An ultrasonic beam scanning system as just described uniquely determines a target's position in space relative to a telescopic axis independently of range, and offers excellent resolution capability because angle determination is based on a measurement of time. High quality optics are not required since the angular sensing function is strictly a scanning position-time measurement relationship requiring only the collection of radiant energy rather than producing an image of the target itself. Signal to noise ratio is also improved by the use of the scanning technique. The use of an ultrasonic cell offers better resolution than other scanning techniques because of the greater attainable scan angles, and such cells consume less power than other devices.

The second or detecting telescope may be eliminated by using beam splitting optics in the transmitting telescope. Also the laser beam need not be transmitted through a telescope, but may scan the target area independently, thereby eliminating the transmitting telescope. The field of view would be altered if no transmitting telescope is used. A receiving telescope would be required for this modification. Likewise it would be possible to convert the system described to perform a beam steering function by utilizing the error signal, that is the off axis signal, in conjunction with the synchronization and modulation circuitry 29 to redirect the beam so that the entire outgoing pulse falls on the target. Such a technique is valuable for communicating with the satellite.

In performing the beam steering function, the gated laser 10 emits a train of pulses at the gating frequency of the one dimensional ultrasonic cell 18, for example 100,000 cycles per second, for a period equal to the laser pumping time, for example 2 milliseconds. The two dimensional ultrasonic beam scanner 12 is also driven at 100,000 cycles per second at a constant acoustic power level whereby circular scan is generated, the angle of deflection of the laser beam corresponding to the angle between the telescope 14 axis and the target. Consequently the target is intersected once for each circular scan, with the laser being pulsed at the proper time to illuminate the target. The laser scanning cell 18 and ultrasonic scanning cell are synchronized to insure that the gated laser pulses, one each circular scan, are emitted at the proper scan azimuthal angle. The ultrasonic cell synchronizing and modulating circuitry is embodied in block 29. By this method the laser is pulsed and steered in a direction and at a time to illuminate the target, and may be used for communication.

In another modification of the invention, the target is illuminated continuously by any light source. An image of a field of view containing the target is focused upon one side of a photo conductive material which requires activation from both sides to produce a signal. The other side of the photo conductive material is actively scanned by a laser beam, the deflection being provided by an ultrasonic cell. A spiral scanner may be used. When the scanning laser beam strikes the side of photo conductive material at the position of the target image, an electrical signal is generated. The angular position of the target can be computed as described previously.

While the invention has been described in its preferred embodiment, it is obvious that numerous changes may be made in the construction and arrangement of parts without departing from the scope of the invention as defined in the following claims.

We claim:
1. Apparatus comprising a laser, means for actuating said laser to produce a beam of light, scanning means for causing said light beam to scan an area containing a target in a diverging-converging spiral pattern whereby said target is intersected by said light beam once during the diverging portion and once during the converging portion of said scan, means for receiving the laser light reflected from said target and producing signals in response thereto, timing means responsive to the time interval between said signals for producing an output indicative of the position of said target in said area, and means for producing synchronization between said scanning means and said timing means.

2. Apparatus as in claim 1 and including means for measuring the time between actuation of said laser and receipt of said signals to produce an indication of target range.

3. Apparatus as in claim 1 in which said laser is pulsed once during each diverging-converging spiral pattern cycle.

4. Apparatus as in claim 1 in which said beam scanning means comprises an ultrasonic acoustic cell.

5. Apparatus as in claim 1 and including telescope means having a central axis for transmitting said light beam to scan said target area, said timing means being responsive to the time interval between said signals for producing an output indicative of the angle and magnitude of deviation of said target from said central axis.

6. Apparatus as in claim 1 in which said receiving means includes a photodetector, and further includes receiving telescope means for transmitting said reflected light signal to said photodetector.

7. An angle sensing system for a target comprising a laser for generating a light beam,
scanning means for causing said light beam to scan an area containing a target in a diverging-converging pattern, means for receiving light reflected from said target and producing a signal in response thereto,
timing means responsive to the time interval between the signals received from the target for producing an output indicative of the position of the target, and
means for synchronizing said scanning means and said timing means.

References Cited

Requirement of a Coherent Laser Pulse-Doppler Radar, Biernson et al., Proceedings of the IEEE, Jan. 1963. P. 202–205 relied on.

"Radar System Engineering" Ridenour, 1947, McGraw Hill Book Company, Inc. New York, and London. P. 290–291 relied on.

RONALD L. WIBERT, Primary Examiner

V. P. McGRAW, Assistant Examiner

U.S. Cl. X.R.
356—4